United States Patent
Onuma

(10) Patent No.: US 9,921,431 B2
(45) Date of Patent: Mar. 20, 2018

(54) DISPLAY DEVICE

(71) Applicant: Japan Display Inc., Minato-ku (JP)

(72) Inventor: Takahiro Onuma, Tokyo (JP)

(73) Assignee: Japan Display Inc., Minato-ku (JP)

( * ) Notice: Subject to any disclaimer, the term of this patent is extended or adjusted under 35 U.S.C. 154(b) by 295 days.

(21) Appl. No.: 14/957,060

(22) Filed: Dec. 2, 2015

(65) Prior Publication Data
US 2016/0187706 A1 Jun. 30, 2016

(30) Foreign Application Priority Data
Dec. 25, 2014 (JP) .................................. 2014-262256

(51) Int. Cl.
*G02F 1/1337* (2006.01)
*G02F 1/1333* (2006.01)

(52) U.S. Cl.
CPC ........ *G02F 1/1337* (2013.01); *G02F 1/13338* (2013.01); *G02F 1/133345* (2013.01); *G02F 2001/133388* (2013.01)

(58) Field of Classification Search
None
See application file for complete search history.

(56) References Cited

U.S. PATENT DOCUMENTS

| 7,999,901 | B2* | 8/2011 | Kang | G02F 1/1345 345/104 |
| 8,659,710 | B2* | 2/2014 | Shin | G02F 1/13338 345/173 |
| 8,884,919 | B2* | 11/2014 | Sogabe | H01L 27/124 345/174 |
| 9,063,386 | B2* | 6/2015 | Ro | G02F 1/136286 |
| 9,092,095 | B2* | 7/2015 | Nakanishi | G02F 1/13338 |
| 9,146,412 | B2* | 9/2015 | Abe | G06F 3/0418 |
| 9,690,157 | B2* | 6/2017 | Kawamura | G02F 1/1309 |
| 2012/0320324 | A1* | 12/2012 | Doi | G02F 1/13338 349/138 |

FOREIGN PATENT DOCUMENTS

| JP | 2013-3453 | 1/2013 |
| JP | 5544330 | 7/2014 |

* cited by examiner

*Primary Examiner* — Dennis Y Kim
(74) *Attorney, Agent, or Firm* — Oblon, McClelland, Maier & Neustadt, L.L.P.

(57) ABSTRACT

According to one embodiment, a display device includes a mount portion, a first metal layer, a second metal layer, an interlayer insulating film which is thinner in a non-display area than in a display area, a plurality of lines, a first end, a second end, wherein at least one of the first and second ends comprises a slit formed therein along a second direction from a display area side thereof to a opposite side of the display area side.

20 Claims, 10 Drawing Sheets

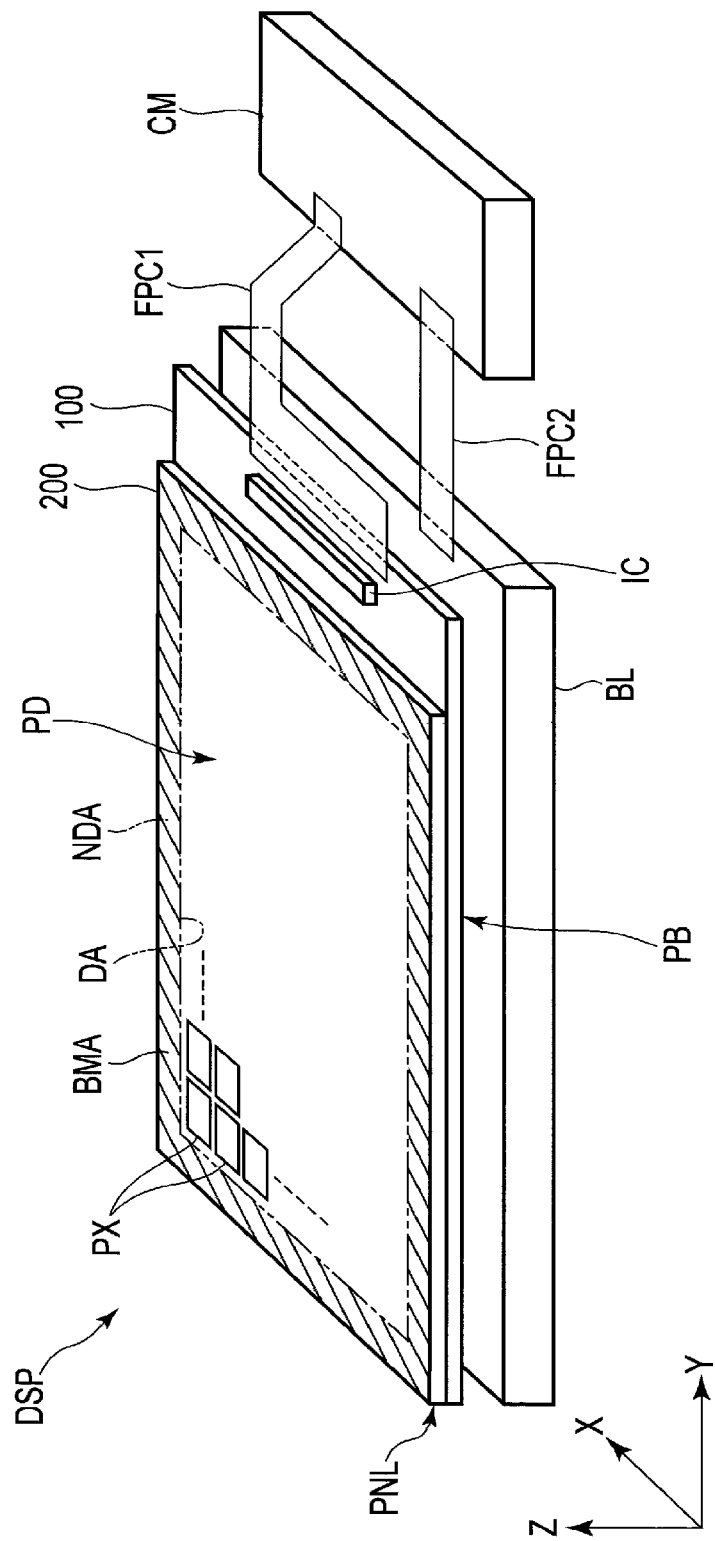
F I G. 1

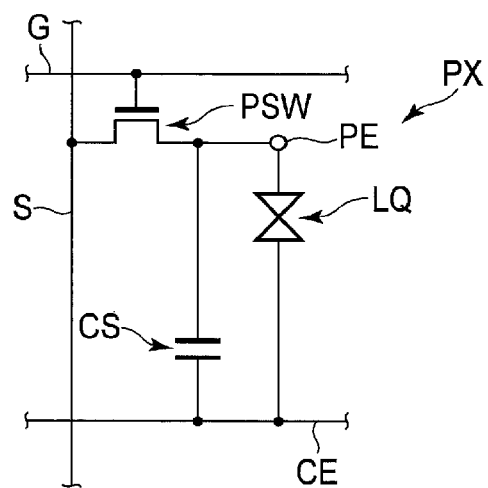
F I G. 2

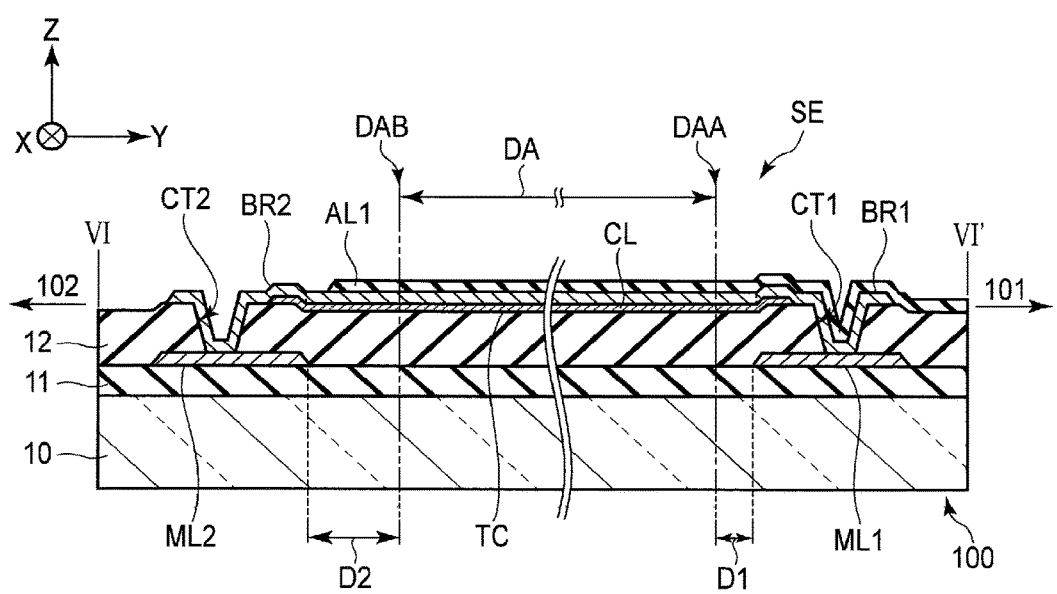
F I G. 6

DISPLAY DEVICE

CROSS-REFERENCE TO RELATED APPLICATIONS

This application is based upon and claims the benefit of priority from Japanese Patent Application No. 2014-262256, filed Dec. 25, 2014, the entire contents of which are incorporated herein by reference.

FIELD

Embodiments described herein relate generally to a display device.

BACKGROUND

Liquid crystal displays include an alignment film formed on a surface in contact with a liquid crystal layer of an opposing substrate to achieve initial alignment of liquid crystal molecules in a liquid crystal layer. If there is a stepped portion in the surface of a flattening film located under the alignment film, the alignment film may suffer a film formation error. Under these circumstances, there has been proposed a technology of avoiding the occurrence of a large step by providing a thin film portion in an edge portion of the pattern of the flattening film.

BRIEF DESCRIPTION OF THE DRAWINGS

FIG. 1 is a perspective view briefly showing a display device according an embodiment.

FIG. 2 is a diagram showing a structure of a pixel.

FIG. 6 is a cross-sectional view taken along VI-VI' shown in FIG. 5 in the first embodiment.

DETAILED DESCRIPTION

Figure 3:
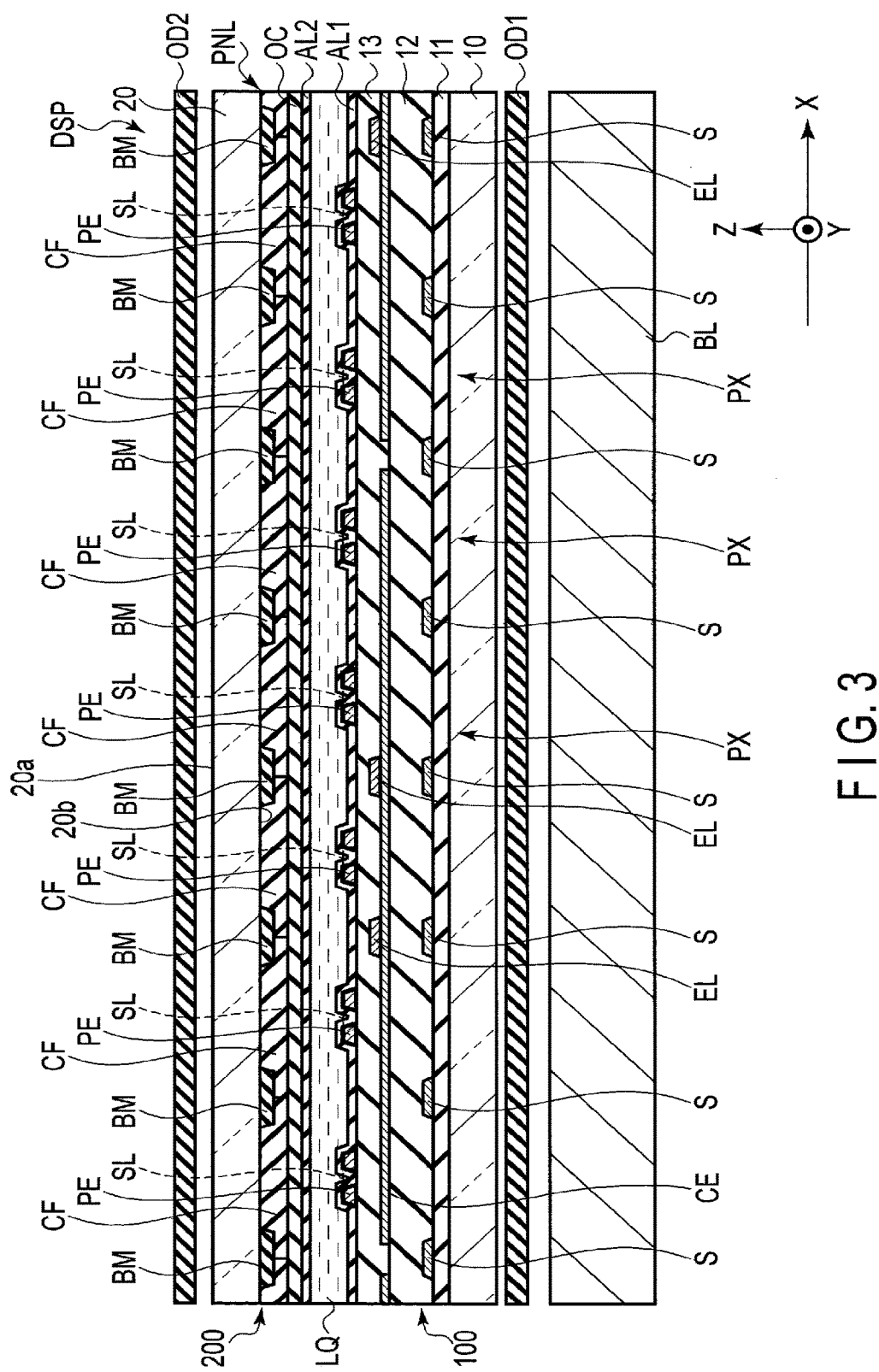
FIG. 3 is a cross-sectional view of the display device.

In general, according to one embodiment, a display device comprises a mount portion disposed on one end side of a non-display area located around a display area configured to display images, a first metal layer formed between the display area and the mount portion and extending in a first direction, a second metal layer formed on the other end side of the non-display area and extending in the first direction, an interlayer insulating film which covers the first and second metal layers and is thinner in the non-display area than in the display area, a plurality of lines extending in a second direction crossing the first direction and arranged along the first direction in the display area, a first end opposing the first metal layer via the interlayer insulating film and electrically connected to the first metal layer and the plurality of lines, a second end opposing the second metal layer via the interlayer insulating film and electrically connected to the second metal layer and the plurality of lines, wherein at least one of the first and second ends comprises a slit formed therein along the second direction from a display area side thereof near the display area to a opposite side of the display area side.

Embodiments will now be described with reference to the accompanying drawings. Note that the disclosure is presented for the sake of exemplification, and any modification and variation conceived within the scope and spirit of the invention by a person having ordinary skill in the art are naturally encompassed in the scope of invention of the present application. Furthermore, a width, thickness, shape, and the like of each element are depicted schematically in the figures as compared to actual embodiments for the sake of simpler explanation, and they do not limit the interpretation of the invention of the present application. Furthermore, in the description and figures of the present application, structural elements having the same or similar functions will be referred to by the same reference numbers and detailed explanations of them that are considered redundant may be omitted.

FIG. 1 is a perspective view briefly showing a display device according to this embodiment. Note that the embodiment will be described in connection with the case where the display device includes a liquid crystal display panel, but the embodiment is not limited to this. The display device may comprise a self-luminous display panel such as an organic electroluminescent panel, an electronic paper display panel of electrophoretic elements, or the like.

A display device DSP comprises a display panel PNL, a drive IC chip IC configured to drive the display panel PNL, a backlight unit BL configured to illuminate the display panel PNL, a control module CM, flexible printed circuits (boards) FPC1 and FPC2, and the like. Note that in this embodiment, a first direction X is taken along, for example, a short side of the display panel PNL. A second direction Y crosses the first direction X and is taken along a long side of the display panel PNL. Further, a third direction Z crosses the first direction X and the second direction Y.

The display panel PNL comprises a first substrate 100, a second substrate 200 disposed to oppose the first substrate 100, a liquid crystal layer (liquid crystal layer LQ, described later) held between the first substrate 100 and the second substrate 200. The display panel PNL comprises a display area DA configured to display images and a frame-like non-display area NDA located around the display area DA.

The display panel PNL comprises pixels PX arranged in a matrix in the display area DA along the first direction X and the second direction Y. Note that the display area DA corresponds to an area surrounded by a peripheral light shielding layer BMA formed into a frame shape in the second substrate 200. The display panel PNL comprises a display surface PD configured to display images and a back surface PB located on a side opposite to the display surface PD.

The backlight unit BL is disposed on a back surface PB side of the display panel PNL. As the backlight unit BL, various forms are applicable, but a detailed explanation of the structure thereof is omitted.

A drive IC chip IC is mounted on the first substrate 100 of the display panel PNL. The flexible printed circuit board FPC1 is mounted on the first substrate 100 to connect the display panel PNL and the control module CM to each other. The flexible printed circuit board FPC2 connects the backlight unit BL and the control module CM to each other.

The display device DSP having such a structure is represented by the so-called transmissive type liquid crystal display, which displays images by selectively transmitting through each pixel PX light entering the display panel PNL from the backlight unit BL. But the display device DSP may be a reflective type liquid crystal display, which displays images by selectively reflecting by each pixel PX external light incident on the display panel PNL, or may be a transreflective type liquid crystal display embodying both transmissive and reflective functions.

FIG. 2 is a diagram showing a structure of a pixel.

Each pixel PX comprises a switching element PSW, a pixel electrode PE, a common electrode CE, a liquid crystal layer LQ, and the like. The switching element PSW is formed from, for example, a thin-film transistor (TFT). The switching element PSW is electrically connected to the gate line G and the signal line S. The gate line G extends, for example, along the first direction X. The signal line S extends along the second direction Y. Note that the gate line G and the signal line S may be formed straight, or at least partly curved or bent.

The pixel electrode PE is electrically connected to the switching element PSW. The pixel electrode PE is disposed to oppose the common electrode CE and is configured to drive the liquid crystal layer LQ by an electric field produced between the pixel electrode PE and the common electrode CE. A storage capacitance CS is formed between, for example, the common electrode CE and the pixel electrode PE.

FIG. 3 is a cross-sectional view of the display device. More specifically, it is a sectional view of the display device DSP taken along the first direction X.

That is, the display device DSP includes the display panel PNL, the backlight unit BL, etc., described above. Note that the display panel PNL illustrated has a structure provided for a display mode which mainly uses a lateral electric field parallel to the main surface of the substrate, but the structure is not particularly limited. The panel may have a structure provided for a display mode using a vertical electric field perpendicular to the main surface of the substrate, an electric field in a direction tilted to the main surface of the substrate, or a combination of these fields.

In the display mode using a lateral electric field, for example, a structure in which the first substrate 100 comprises both the pixel electrode PE and the common electrode CE is applicable. In the display mode using a vertical or tilted electric field, for example, a structure in which the first substrate 100 comprises the pixel electrode PE and the second substrate 200 comprises the common electrode CE is applicable. Note that the main surface of the substrate is a surface parallel to the X-Y plane defined by the first direction X and the second direction Y crossing perpendicular to each other.

The display panel PNL comprises the first substrate 100, the second substrate 200 and the liquid crystal layer LQ. The first substrate 100 and the second substrate 200 are stuck together while a predetermined gap is formed therebetween. The liquid crystal layer LQ is sealed between the first substrate 100 and the second substrate 200.

The first substrate 100 is formed from a first insulation substrate 10 having light transmitting property such as a glass substrate, a resin substrate, or the like. The first substrate 100 comprises, on a side of the first insulation substrate 10 which opposes the second substrate 200, signal lines S, common electrodes CE, pixel electrodes PE, a first insulating film 11, a second insulating film 12, a third insulating film 13, conductive layers EL, a first alignment film AL1 and the like. Note that here, switching elements PSW, gate lines G and various insulating films interposed therebetween are omitted from the illustration.

Each signal line S is formed on the first insulating film 11 and is electrically connected to the source electrode of the switching element PSW of each respective pixel PX. The drain electrode of each switching element PSW, and the like are formed on the first insulating film 11.

The second insulating film 12 is disposed on each signal line S and the first insulating film 11. The common electrodes CE are formed on the second insulating film 12. The common electrodes CE are aligned at intervals along the first direction X. The conductive layers EL are formed on the respective common electrodes CE and are electrically connected thereto. The conductive layers EL are located immediately above the respective signal lines S, for example.

The third insulating film 13 is provided on the common electrodes CE, the conductive layers EL and the second insulating film 12. The pixel electrodes PE are formed on the third insulating film 13. Each pixel electrode PE of each respective pixel PX is located between adjacent signal lines S and opposes the respective common electrode CE via the third insulating film 13. Further, each pixel electrode PE includes a slit SL at a position opposing the respective common electrode CE. The common electrodes CE and the pixel electrodes PE are formed of, for example, a transparent conductive material such as indium tin oxide (ITO) or indium zinc oxide (IZO). The first alignment film AL1 covers the pixel electrodes PE and the third insulating film 13.

On the other hand, the second substrate 200 is formed from a second insulation substrate 20 having light transmitting property, such as a glass substrate, a resin substrate or the like. The second substrate 200 comprises, on a side of the second insulation substrate 20 which opposes the first substrate 100, light shielding layers BM, color filters CF, an overcoat layer OC, a second alignment film AL2 and the like.

The second insulation substrate 20 includes a first major surface 20a on the display surface PD side shown in FIG. 1, and a second major surface 20b on a side opposing the first substrate 100. The light shielding layers BM are formed on a second major surface 20b side of the second insulation substrate 20 to divide into each pixel PX as a compartment.

The color filters CF are formed on the second major surface 20b side of the second insulation substrate 20 to partially overlap the light shielding layers BM, respectively. The color filters CF include, for example, a red filter formed of a resin material colored in red, a green filter formed of a resin material colored in green and a blue filter formed of a resin material colored in blue. Further, the color filter CF may include a white filter formed of a transparent resin material or a lightly colored resin material. Note that the color filters CF may be provided in the first substrate 100. The overcoat layer OC covers the color filters CF. The overcoat layer OC is formed of a transparent resin material. The second alignment film AL2 covers the overcoat layer OC.

A first optical device OD1 is arranged between the first insulation substrate 10 and the backlight unit BL. A second optical device OD2 is arranged on a first major surface 20a side of the second insulation substrate 20. The first optical device OD1 and the second optical device OD2 each include at least a polarizer, and may each include a retardation plate if needed. The polarizer included in the first optical device OD1 and the polarizer included in the second optical device OD2 are arranged, for example, in a crossed Nicols relationship, where absorption axes thereof normally cross each other.

Figure 4:
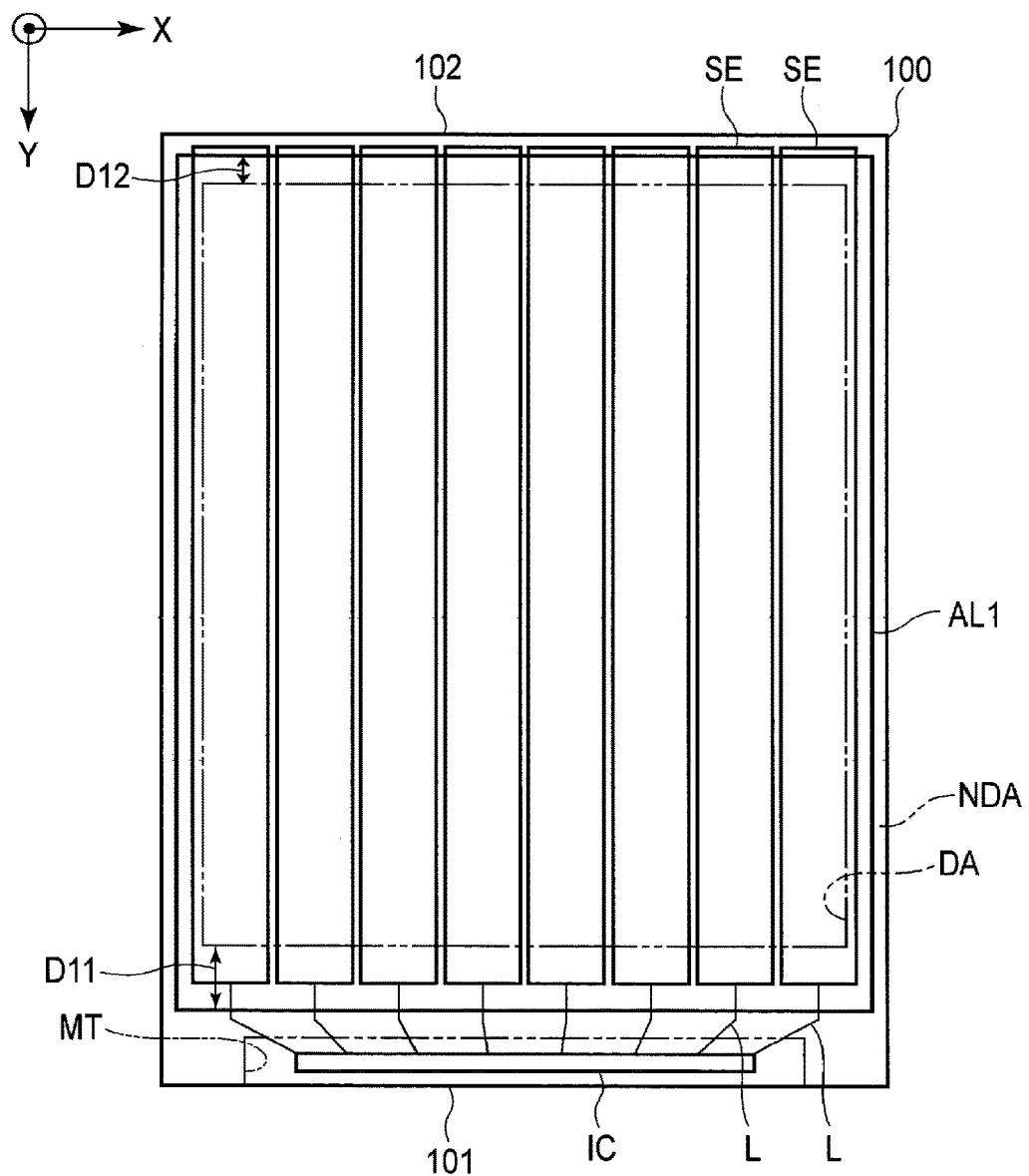
FIG. 4 is a diagram showing sensor electrodes in a first substrate.

FIG. 4 is a diagram showing sensor electrodes in the first substrate.

The first substrate 100 comprises sensor electrodes SE, a mount portion MT, leads L and a first alignment film AL1. Note that the first substrate 100 includes the display area DA and the non-display area NDA and comprises, in the non-display area NDA, one end 101 located on one side in the second direction Y and an other end 102 located on another side in the second direction Y.

The sensor electrodes SE are each formed into a belt-like shape along the second direction Y in the display area DA and extending to an end 101 side and the other end 102 side of the non-display area NDA. Further, the sensor electrodes SE are arranged along the first direction X and are formed on substantially the entire surface of the display area DA.

The mount portion MT is located in the non-display area NDA of the first substrate 100 on the end 101 side. In the illustrated example, the width along the second direction Y of the one end 101 side of the non-display area NDA including the mount portion MT is greater than that along the second direction Y of the other end 102 side of the non-display area NDA. In the mount portion MT, the first substrate 100 comprises a drive IC chip IC. In the illustrated example, the leads L are formed on the end 101 side of the non-display area NDA and extend from the respective sensor electrodes SE to the mount portion MT. The leads L electrically connect the respective sensor electrodes SE to the drive IC chip IC.

The first alignment film AL is formed by applying a material onto a side of the first substrate 100, on which the sensor electrodes SE are formed, followed by curing. The curing is carried out, for example, by a chemical reaction such as photo-curing or thermal curing. The first alignment film AL1 is formed of, for example, a resin material such as polyimide. The first alignment film AL1 may be subjected to an alignment treatment, if needed, and is formed of a material having appropriate alignment properties, such as horizontal alignment properties or vertical alignment properties, according to the display mode of liquid crystal. The first alignment film AL1 is provided continuously over the entire display area DA, and its end portion can extend to the non-display area NDA. In the non-display area NDA, a width D11 of the first alignment film AL1 extending toward the one end 101 side, taken along the second direction Y is greater than a width D12 of the first alignment film AL1 extending toward the other end 102 side taken along the second direction Y. For example, in the non-display area NDA by the side of the end 101, the first alignment film AL1 opposes the ends of the sensor electrodes SE and further extends toward the mount portion MT. Note that according to the illustrated example, in the non-display area NDA by the side of the other end 102, the first alignment film AL1 does not extend up to the position opposing the ends of the sensor electrodes SE.

In this embodiment, for example, the sensor electrodes SE function as electrodes for a capacitive touch panel. In such a case, voltage is applied to the sensor electrodes SE and the change in voltage or current due to the change in capacitance caused when an object to be detected approaches is sent to a detector circuit as a detection signal. Note that the detector circuit may be provided in the drive IC chip IC, the control module CM, the flexible printed circuit board FPC1 or the like shown in FIG. 1, or may be provided in the electronic device to which the display device DSP of this embodiment is mounted. The detection signal is analyzed in the detector circuit. The detector circuit analyzes the detection signal to detect the position within the display area DA, of an object to be detected which approaches or contacts the display area DA. When a touch panel is formed in corporation with the sensor electrodes SE, the display device DSP should desirably further comprise electrodes extending in the first direction X and arranged along the second direction Y.

In this embodiment, the sensor electrodes SE correspond to the common electrodes CE as well. That is, during a display period in which images are displayed on the display area DA, a voltage for producing an electric field in the liquid crystal layer LQ to control the display by the pixels PX is applied to the sensor electrodes SE. During a detection period, which is at a different timing from that of the display period, a voltage for detecting the approach or contact of an object to be detected is applied to the sensor electrodes SE.

Figure 5:
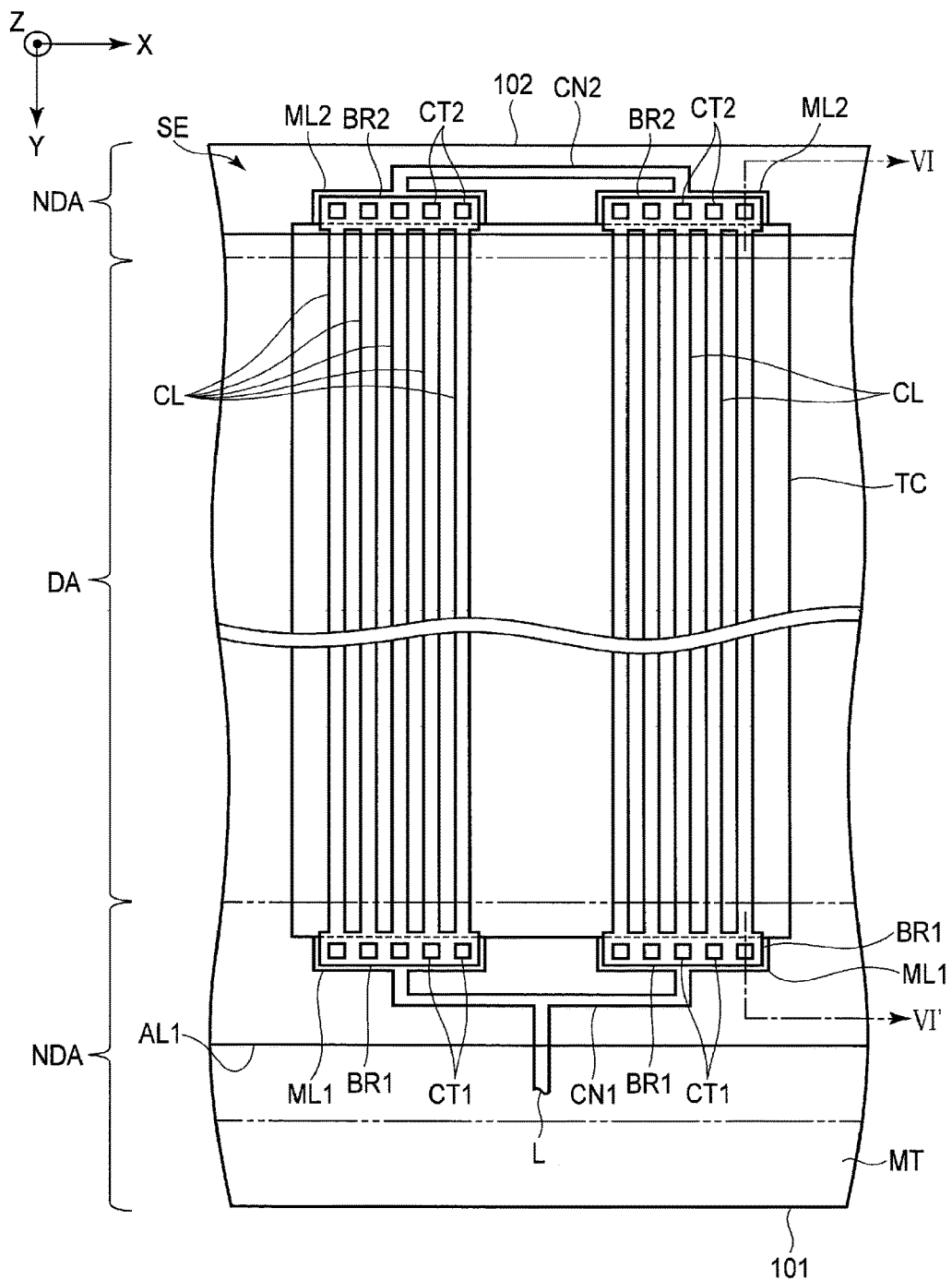
FIG. 5 is a plan view of a structure of sensor electrodes.

FIG. 5 is a plan view showing the structure of a sensor electrode.

A sensor electrode SE comprises a transparent conductive film TC, first metal layers ML1, second metal layers ML2, lines CL, first ends BR1 and second ends BR2.

The transparent conductive film TC is equivalent to the common electrode CE, described with reference to FIG. 3, and is formed into a belt-like shape elongated along the second direction Y inside the display area DA. Further, the transparent conductive film TC extends to a one end 101 side and another end 102 side of the non-display area NDA.

The first metal layers ML1 are formed on the end 101 side of the non-display area NDA and more specifically, formed between the display area DA and the mount portion MT. The second metal layers ML2 are formed on the other end 102 side of the non-display area NDA. The first metal layer ML1 and the second metal layer ML2 each extend in the first direction X. The first metal layers ML1 comprise partial metal layers arranged along the first direction X. An adjacent pair of first metal layers ML1 is electrically connected to each other through a first connection portion CN1. Further, the first connection portion CN1 is electrically connected to a respective lead L. Moreover, the second metal layers ML2 comprise partial metal layers arranged along the first direction X. An adjacent pair of second metal layers ML2 is electrically connected to each other through a second connection portion CN2. The first metal layers ML1, the second metal layers ML2, the first connection portion CN1, the second connection portion CN2 and the lead L are located, for example, in the same layer, and they can be formed all in one step using the same electrical conducting material.

The lines CL are equivalent to the conductive layer EL, described with reference to FIG. 3, and oppose the transparent conductive film TC. The lines CL each extend along the second direction Y inside the display area DA, and are arranged along the first direction X. Further, the lines CL extend to the one end 101 and the other end 102 side of the non-display area NDA. These lines CL are arranged, for example, along the first direction X at equal intervals, but the intervals between adjacent lines CL need not be constant. In the illustrated example, the lines CL are each formed into the shape of a straight line parallel to the second direction Y, but the shape of the lines CL is not limited to a straight line, but it may be bent or curved.

The first ends BR1 are formed on the end 101 side of the non-display area NDA, and oppose the respective first metal layers ML1. The first ends BR1 are electrically connected to the respective first metal layers ML1 through respective first contact portions CT1. The first ends BR1 extend along the first direction X as in the case of the first metal layers ML1, and the first contact portion CT1 are arranged along the first direction X.

The second ends BR2 are formed on the other end 102 side of the non-display area NDA, and oppose the respective second metal layers ML2. The second ends BR2 are electrically connected to the respective second metal layers ML2 through respective second contact portions CT2. The second ends BR2 extend along the first direction X as in the case of the second metal layers ML2 and the second contact portions CT2 are arranged along the first direction X.

The first ends BR1 and the second ends BR2 are electrically connected to the respective lines CL. The lines CL, the first ends BR1 and the second ends BR2 are located, for example, in the same layer and they can be formed all in one step using the same conducting material. As described above, the transparent conductive film TC, the first metal layers ML1, the second metal layers ML2, the lines CL, the first ends BR1 and the second ends BR2, which constitutes the sensor electrode SE, are electrically connected to each other.

Note that the leads L, the first metal layers ML1, the second metal layers ML2, the lines CL, the first ends BR1 and the second end BR2 are formed using a conducting material such as aluminum, gold, silver, copper, chromium, molybdenum, tantalum, titanium, indium, iridium, rhodium or tungsten.

FIG. 6 is a cross-sectional view taken along VI-VI' shown in FIG. 5 in the first embodiment. In the explanation of FIG. 6, an "up" side refers to a side where the first alignment film AL1 is located with respect to the first insulation substrate 10. Further, in FIG. 6, illustration of the third insulating film 13 located in display area DA and the pixel electrode PE is omitted.

In one example, the first metal layers ML1 and second metal layers ML2 are formed on the first insulating film 11, are located in the same layer as the signal lines S shown in FIG. 3 and are formed of the same material as that of the signal lines S.

The second insulating film 12 is formed on the first insulating film 11 and is equivalent to the interlayer insulating film which covers the first metal layers ML1 and the second metal layers ML2. The first contact portions CT1 are formed in the positions opposing the first metal layers ML1, respectively, through the second insulating film 12. The second contact portions CT2 are formed in the positions opposing the second metal layer ML2, respectively, thorough the second insulating film 12. The second insulating film 12 is formed of, for example, an organic material such as acryl resin, to be thicker than the first insulating film 11 which is formed of an inorganic material. But, the upper surface of the second insulating film 12 is not necessarily planer. In the illustrated example, the upper surface of the second insulating film 12 located immediately above the first metal layers ML1 and second metal layers ML2 projects upward along the third direction Z with respect to the upper surface of the second insulating film 12 located in the display area DA.

The transparent conductive film TC is formed on the second insulating film 12. The transparent conductive film TC may or may not oppose the first metal layers ML1 and the second metal layers ML2. In the illustrated example, the transparent conductive film TC is not formed inside the first contact portions CT1 and the second contact portions CT2.

The lines CL are formed on the transparent conductive film TC. The first ends BR1 and the second ends BR2 are formed continuously from the lines CL. The first ends BR1 are formed on the second insulating film 12 and inside the first contact portions CT1. The first ends BR1 are in contact with the first metal layers ML1 inside the first contact portions CT1 and are electrically connected thereto. The second ends BR2 are formed on the second insulating film 12 and inside the second contact portion CT2. The second ends BR2 are in contact with the second metal layers ML2 inside the second contact portions CT2 and are electrically connected thereto. The first ends BR1 and the second ends BR2 each include a portion projecting upward along the third direction Z with respect to the lines CL, caused by the steps made on the first metal layers ML1 and the second metal layers ML2 or the upper surface of the second insulating film 12.

The first alignment film AL1 is formed above the lines CL in the display area DA. The first alignment film AL1 is formed on the second insulating film 12 to cover the first ends BR1 on the end 101 side of the non-display area NDA. Note that in the illustrated example, the first alignment film AL1 does not cover the second ends BR2 on the other end 102 side of the non-display area NDA. In other words, the first alignment film AL1 does not extend to the position immediately above the second metal layer ML2.

The first metal layers ML1 are arranged in the positions a first distance D1 away from one end DAA of the display area DA along the second direction Y. The second metal layers ML2 are arranged in the positions a second distance D2 away from another end DAB of the display area DA along the second direction Y. The second distance D2 is greater than the first distance D1. That is, the second metal layers ML2 located in the other end 102 side of the non-display area NDA are disposed in the positions further away from the display area DA than the first metal layers ML1 located in the one end 101 side of the non-display area NDA, which is wider than the other end 102 side. Note that the first ends BR1 oppose the first metal layers ML1 and the second ends BR2 oppose the second metal layers ML2, and thus the second ends BR2 are disposed in the positions further away from the display area DA than the first ends BR1. Here, the one end DAA and the other end DAB of the display area DA correspond to respective positions of an inner edge of the peripheral light shielding layer BMA, described with reference to FIG. 1.

Incidentally, in an application step for forming the first alignment film AL1, the liquefied material of the first alignment film AL1 is applied on the surface of the first substrate 100 while the first insulation substrate 10 facing downward and the sensor electrodes SE upward. Here, the first alignment film AL1 needs to be formed over the entire surface of the display area DA. But, when a step is formed in the surface where a liquefied material is to be applied, the spreading of the liquefied material may be easily blocked. In order to avoid this, it has been considered to increase the amount of the liquefied material to apply the material over a wide area including the display area DA.

On the other hand, when the first alignment film AL1 is formed of a material having high moisture permeability, it is not desirable for the first alignment film AL1 to extend to the end of the first substrate 100 to be exposed to external air. For this reason, the first alignment film AL1 should desirably be formed to be terminated on an inner side from the end of the first substrate 100. In recent years, there has been a demand for narrowing frame of display devices DSP, and thus there is a tendency wherein the widths of non-display areas NDA along the sides are reduced except for the mount portion MT. Therefore, the liquefied material is applied in a comparatively wide area toward the mount portion MT from the display area DA, but the amount applied to the non-display area NDA along each side except for the mount portion MT is limited.

As described above, the display device DSP comprises sensor electrodes SE each including the first metal layers ML, the second metal layers ML2, the lines CL, the first ends BR1 and the second ends BR2. The second metal layers ML2 are located directly under the second ends BR2. With this configuration, the surfaces of the second ends BR2, on a side opposing the first alignment film AL1 may be located on a side away from the first insulation substrate 10 along the third direction Z as compared to the surfaces of the lines CL, which opposes the first alignment film AL1. That is, in the state where the first insulation substrate 10 faces downward and the sensor electrodes SE upward, the surfaces of the second ends BR2 are located in positions higher than the surfaces of the lines CL and therefore a step may be created in the under layer of the of first alignment film AL1.

According to the first embodiment, the second metal layers ML2 are located in the positions further away from the display area DA than from the first metal layers ML1. With this configuration, even if a step is created between the surfaces of the second ends BR2, which oppose the second metal layers ML2, and the surfaces of the lines CL, the spreading of the liquefied material of the first alignment film AL1 is not easily blocked in the display area DA near the second ends BR2, thus enabling to form the first alignment film AL1 up to the other end DAB of the display area DA. Meanwhile, the liquefied material of the first alignment film AL1 is applied on comparatively a wide range from the display area DA toward the mount portion MT, thereby making it possible to form the first alignment film AL1 reliably up to the end DAA of the display area DA. Thus, it is possible to form the first alignment film AL1 to have substantially uniform thickness over the entire display area DA. Thus, it is possible to suppress the formation error of the first alignment film AL1, or the degradation of display quality, caused by non-uniformity in film thickness.

Next, the second embodiment will be described.

Figure 7A:
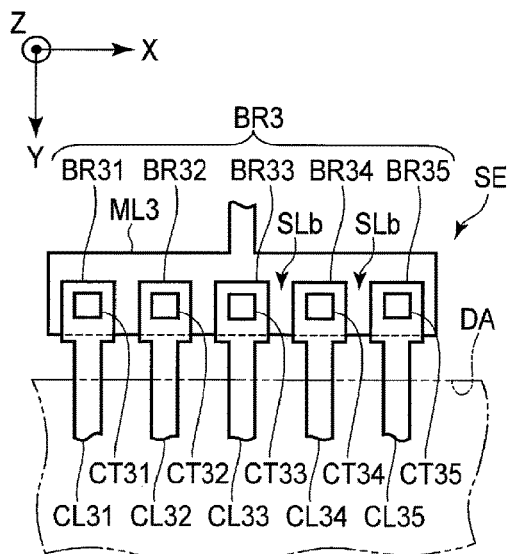
FIG. 7A is a diagram showing the shape of an end in a second embodiment.

FIG. 7A is a diagram showing the shape of an end in the second embodiment. FIGS. 7B to 7H are diagrams showing modified examples of the end illustrated in FIG. 7A. Note that the structures shown in FIGS. 7A to 7H may be carried out solely or in combination.

A third end BR3 is formed discontinuously along the first direction X. In other words, the third end BR3 of the example shown in FIG. 7A includes slits SLb formed therein from the display area DA side along the second direction Y. The slits SLb are made through the third end BR3 along the third direction Z and also through the third end BR3 along the second direction Y. The slits SLb are formed in positions corresponding to a region between each adjacent pair of the lines CL31 to CL35. Contact portions CT31 to CT35 are formed for the lines CL31 to CL35, respectively. The slits SLb are made through along the second direction Y between regions of the third end BR3, which oppose the contact portions CT31 to CT35. Thus, the third end BR3 is partitioned by the slits SLb into segments BR31 to BR35 opposing the contact portions CT31 to CT35 respectively. The segments BR31, BR32, BR33, BR34 and BR35 are arranged in this order along the first direction X. In the illustrated example, the segments BR31 to BR35 are aligned on the same straight line along the first direction X.

The third end BR3 opposes a third metal layer ML3. The segment BR31 is formed to be integrated with a line CL31 and is electrically connected to the third metal layer ML3 through the contact portion CT31. Further, the segment BR32 is formed to be integrated with a line CL32 and is electrically connected to the third metal layer ML3 through the contact portion CT32. The segment BR33 is formed to be integrated with a line CL33 and is electrically connected to the third metal layer ML3 through the contact portion CT33. The segment BR34 is formed to be integrated with a line CL34 and is electrically connected to the third metal layer ML3 through the contact portion CT34. The segment BR35 is formed to be integrated with a line CL35 and is electrically connected to the third metal layer ML3 through the contact portion CT35. Note that in the third end BR3, the number of segments or the number of lines is not limited to that of the illustrated example.

The third end BR3 is applicable to at least one of the first end BR1 and the second end BR2 in the first embodiment described above. The third metal layer ML3 corresponds to a first metal layer ML1 or second metal layer ML2 shown in FIG. 5. The contact portions CT31 to CT35 correspond to first contact portions CT1 or second contact portions CT2 shown in FIG. 5. The lines CL31 to CL35 correspond to the lines CL shown in FIG. 5.

According to the second embodiment, the third end BR3 is formed discontinuously along the first direction X. With this configuration, even if a step is created between the surface of third end BR3, which oppose the third metal layer ML3, and the surfaces of the lines CL, gaps between the adjacent segments of the third end BR3 function as flow paths, making it possible to promote the spreading of the liquefied material from the display area DA to the non-display area NDA in the application step.

The second embodiment is applicable to not only the case where the second distance D2 shown in FIG. 6 is greater than the first distance D1, but also the case where the second distance D2 is less than or equal to the first distance D1. That is, even if the third end BR3 is located close to the display area DA, the first alignment film AL1 can be formed to have a substantially uniform thickness over the entire display area DA regardless of the relationship between the first distance D1 and the second distance D2 as to which is greater. Therefore, an effect similar to that of the first embodiment can be obtained.

Figure 7B:
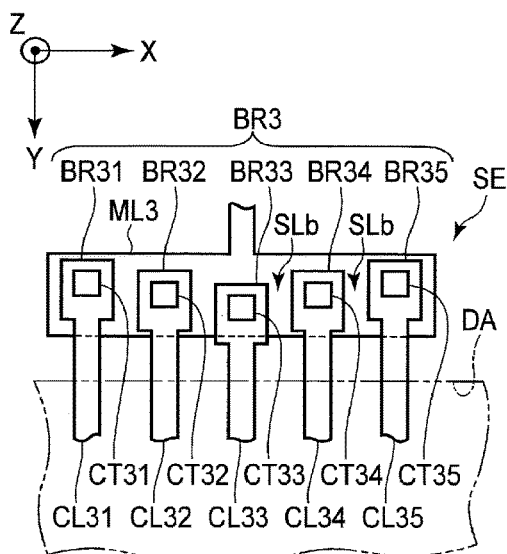
FIG. 7B is a diagram showing a modified example of the end shown in FIG. 7A.

The third end BR3 of the modified example of FIG. 7B is different from the third end BR3 of FIG. 7A in the positions of segments BR31 to BR35. More specifically, of the segments BR31 to BR35 arranged along the first direction X, the position of the segment BR33 is closer to the display area DA in terms of the second direction Y than those of the segments BR32 and BR34. Further, the segment BR31 is located further away from the display area DA in terms of the second direction Y than the segment BR32. The segment BR35 is located further away from the display area DA in terms of the second direction Y than the segment BR34. That is, of the segments BR31 to BR35 arranged along the first direction X, the segment BR33 located in the center is closest to the display area DA, and as the location becomes further away from the center, the position of the segment is further away from the display area DA.

In this modified example as well, an effect similar to that of the second embodiment can be obtained. Particularly, in this modified example, as the position is further away from the center of the third end BR3, it is possible to promote more the spreading of the liquefied material.

Figure 7C:
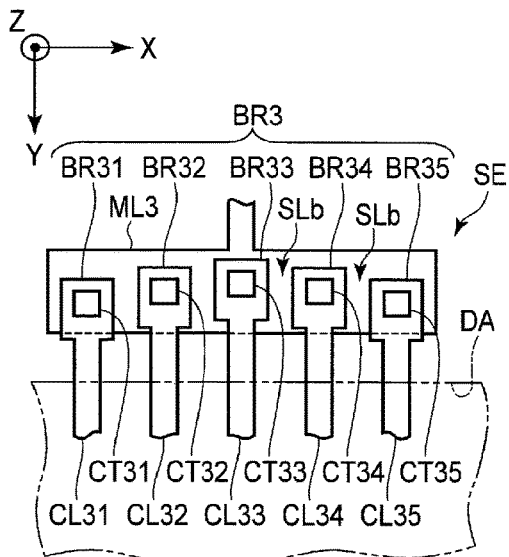
FIG. 7C is a diagram showing another modified example of the end shown in FIG. 7A.

The third end BR3 of the modified example of FIG. 7C is different from the third end BR3 of FIG. 7A in the positions of segments BR31 to BR35. More specifically, of the segments BR31 to BR35 arranged along the first direction X, the position of the segment BR33 is further away from the display area DA in terms of the second direction Y than those of the segments BR32 and BR34. Further, the segment BR31 is located closer to the display area DA in terms of the second direction Y than the segment BR32. The segment BR35 is located closer to the display area DA in terms of the second direction Y than the segment BR34. That is, of the segments BR31 to BR35 arranged along the first direction X, the segment BR33 located in the center is away most further from the display area DA, and as the location becomes further away from the center, the position of the segment is closer to the display area DA.

In this modified example as well, an effect similar to that of the second embodiment can be obtained. Particularly, in this modified example, as the position is closer to the center of the third end BR3, it is possible to promote more the spreading of the liquefied material.

Figure 7D:
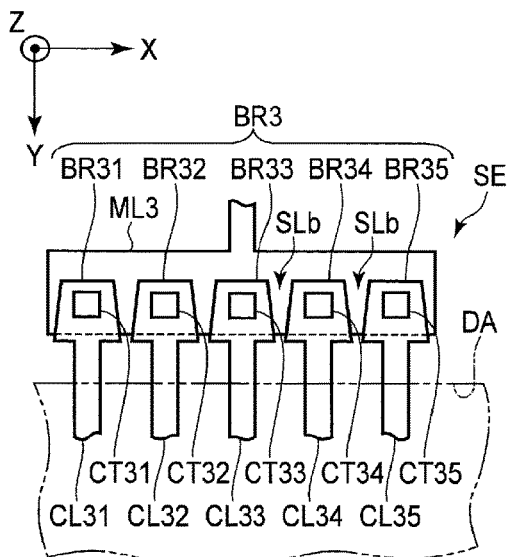
FIG. 7D is a diagram showing still another modified example of the end shown in FIG. 7A.

The third end BR3 of the modified example of FIG. 7D is different from the third end BR3 of FIG. 7A in the shape of segments BR31 to BR35. More specifically, the segments BR31 to BR35 are non-rectangular and the length of a side closer to display area DA along the first direction X is greater than that of a side far from the display area DA along the first direction X.

In this modified example as well, an effect similar to that of the second embodiment can be obtained. Particularly, in this modified example, the gap between adjacent pairs of the segments BR31 to BR35 expands as becoming further from the display area DA, it is possible to promote the outflow of the liquefied material toward the side away from the display area DA.

Figure 7E:
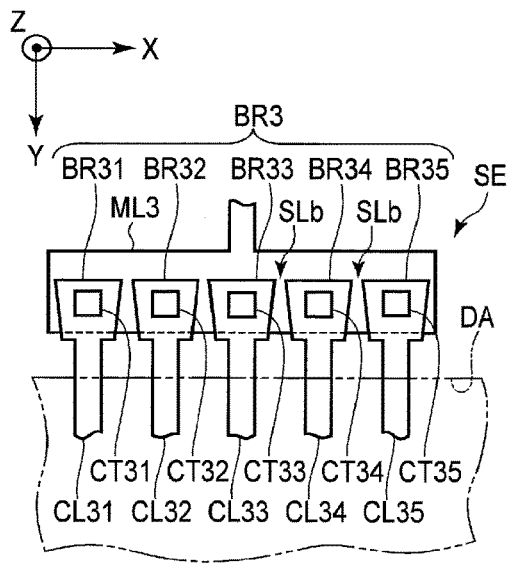
FIG. 7E is a diagram showing still another modified example of the end shown in FIG. 7A.

The third end BR3 of the modified example of FIG. 7E is different from the third end BR3 of FIG. 7A in the shape of segments BR31 to BR35. More specifically, the segments BR31 to BR35 are non-rectangular and the length of a side closer to display area DA along the first direction X is less than that of a side far from the display area DA along the first direction X.

In this modified example as well, an effect similar to that of the second embodiment can be obtained. Particularly, in this modified example, the gap between adjacent pairs of the segments BR31 to BR35 expands as becoming closer to the display area DA, it is possible to assure the capacity to receive the liquefied material spreading from the display area DA toward the third end BR3. In this manner, it is possible to promote the spreading of the liquefied material from the display area DA toward the third end BR3.

Figure 7F:
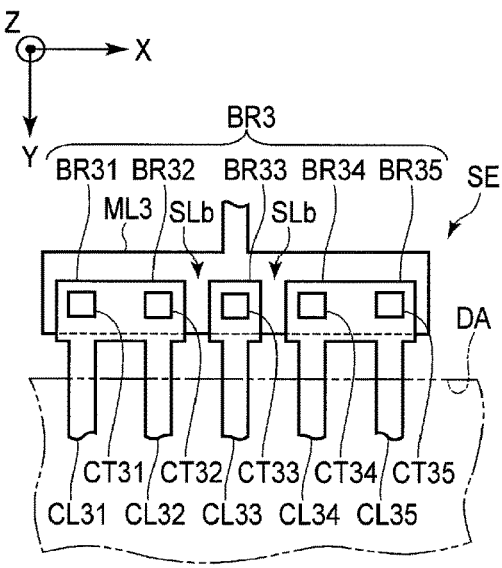
FIG. 7F is a diagram showing still another modified example of the end shown in FIG. 7A.

The third end BR3 of the modified example of FIG. 7F is different from the third end BR3 of FIG. 7A in the shape of segments BR31 to BR35. More specifically, the segment BR31 is formed continuously to the segment BR32, which is adjacent thereto in the first direction X. Further, the segment BR34 is formed continuously to the segment BR35, which is adjacent thereto in the first direction X. Furthermore, the segment BR33 is formed discontinuously to the segments BR32 and BR34, which are adjacent thereto along the first direction X, because of the slits SLb formed between the segment BR32 and segment BR33 and between the segment BR33 and the segment BR34.

In this modified example as well, gaps are formed between the segments BR32 and BR33 and between the segments BR34 and BR33, and therefore an effect similar to that of the second embodiment can be obtained.

Figure 7G:
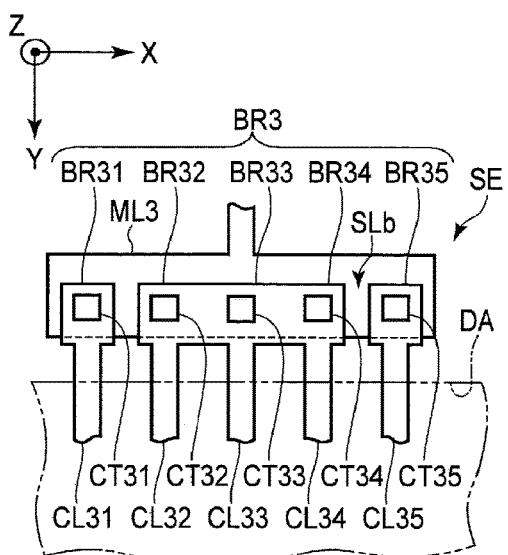
FIG. 7G is a diagram showing still another modified example of the end shown in FIG. 7A.

The third end BR3 of the modified example of FIG. 7G is different from the third end BR3 of FIG. 7A in the shape of segments BR31 to BR35. More specifically, the segment BR31 is formed discontinuously to the segment BR32, which is adjacent thereto in the first direction X, because of the slit SLb formed between the segments BR31 and BR32. Further, the segment BR33 is formed continuously to the segments BR32 and BR34, which are adjacent thereto along the first direction X. Furthermore, the segment BR35 is formed discontinuously to the segment BR34, which is adjacent thereto in the first direction X, because of the slit SLb formed between the segments BR34 and BR35.

In this modified example as well, gaps are formed between the segments BR31 and BR32 and between the segments BR34 and BR35, and therefore an effect similar to that of the second embodiment can be obtained.

Figure 7H:
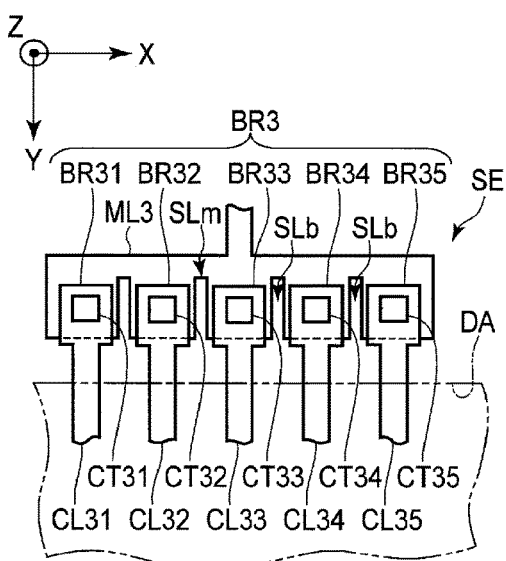
FIG. 7H is a diagram showing still another modified example of the end shown in FIG. 7A.

The third end BR3 of the modified example of FIG. 7H is different from the third end BR3 of FIG. 7A in the shape of the third metal layer ML3. More specifically, the third metal layer ML3 is formed into a comb shape. The third metal layer ML3 includes metal layer slits SLm formed therein in positions opposing the slits SLb, respectively. The metal layer slits SLm are formed from the display area DA side and are interrupted in the middle without being made through the third metal layer ML3 along the second direction Y. In other words, the third metal layer ML3 is, in the locations away from the display area DA along the second direction Y, formed continuously along the first direction X. The third metal layer ML3 opposes each of the segments BR31 to BR35. The third metal layer ML3 includes notches formed in regions between the segments BR31 and BR32, between the segments BR32 and BR33, between the segments BR33 and BR34 and between segments BR34 and BR35.

In the modified example above, a step is created immediately above the third metal layer ML3, but the step is lowered immediately above the notches. With this structure, it is possible to assure the capacity to receive the liquefied material spreading from the display area DA toward the third end BR3. In this manner, it is possible to promote the spreading of the liquefied material from the display area DA toward the third end BR3.

Next, the third embodiment will be described.

Figure 8A:
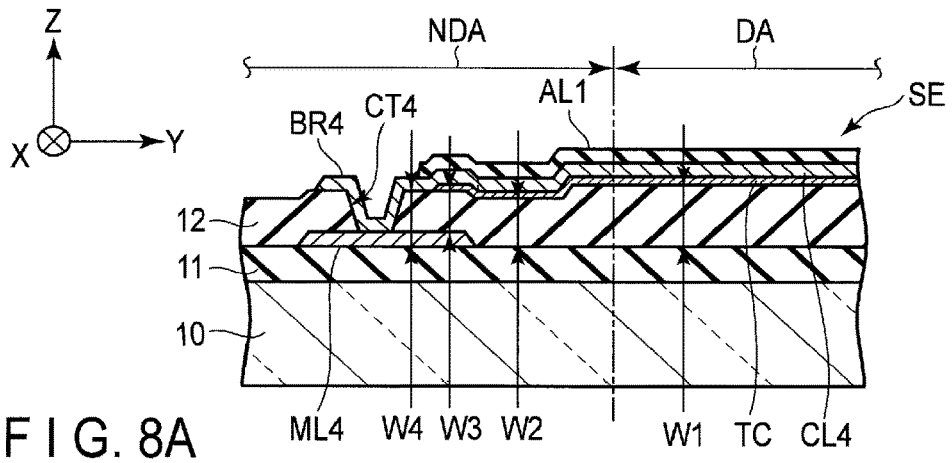
FIG. 8A is a diagram showing a shape of a second insulating film in the third embodiment.

FIG. 8A is a diagram showing the shape of a second insulating film 12 in the third embodiment. Further, FIGS. 8B to 8F are each a diagram showing a modified example of the second insulating film 12 shown in FIG. 8A. Note that in FIGS. 8B to 8F, the third insulating film 13 and the pixel electrode PE located in the display area DA are omitted from the illustrations.

A sensor electrode SE comprises a fourth end BR4, a fourth metal layer ML4, a contact portion CT4 and an interconnecting line CL4. The fourth end BR4 opposes the fourth metal layer ML4 through the second insulating film 12 which covers the fourth metal layer ML4. The fourth end BR4 is electrically connected to the fourth metal layer ML4 through the contact portion CT4. The fourth end BR4 is formed to be integrated with the line CL4. The fourth end BR4 is applicable to at least one of the first end BR1 and the second end BR2 in the first embodiment. The fourth metal layer ML4 corresponds to the first metal layer ML1 or the second metal layer ML2 shown in FIG. 5 and the contact portion CT4 corresponds to the first contact portion CT1 or the second contact portion CT2 shown in FIG. 5.

In the third embodiment, the second insulating film 12, which is an interlayer insulating film, is thinner in the display area DA than in the non-display area NDA. That is, in the example shown in FIG. 8A, the second insulating film 12 has a first thickness W1 in the display area DA along the third direction Z. The second insulating film 12 has a second thickness W2 in the region between the display area DA and the fourth metal layer ML4 along the third direction Z. The second thickness W2 is less than the first thickness W1. Further, the second insulating film 12 has a third thickness W3 in the region opposing the fourth metal layer ML4 along the third direction Z. The third thickness W3 is less than or equal to the second thickness W2. A total of the third thickness W3 and the thickness of the fourth metal layer ML4 along the third direction Z is a fourth thickness W4. Here, the fourth thickness W4 is greater than the second thickness W2.

According to the third embodiment, the second insulating film 12 located in the lower layer of the first alignment film AL1 is thinner in the display area DA than in the non-display area NDA. With this configuration, formation of such a step as to project from the display area DA is suppressed in the non-display area NDA. Thus, it is possible to promote the spreading of the liquefied material from the display area DA to the non-display area NDA in the application step.

The third embodiment is applicable to not only the case where the second distance D2 shown in FIG. 6 is greater than the first distance D1, but also the case where the second distance D2 is less than or equal to the first distance D1. That is, even if the fourth end BR4 is located close to the display area DA, the first alignment film AL1 can be formed to have substantially a uniform thickness over the entire display area DA regardless of the relationship between the first distance D1 and the second distance D2 as to which is greater. Therefore, an effect similar to that of the first embodiment can be obtained.

Figure 8B:
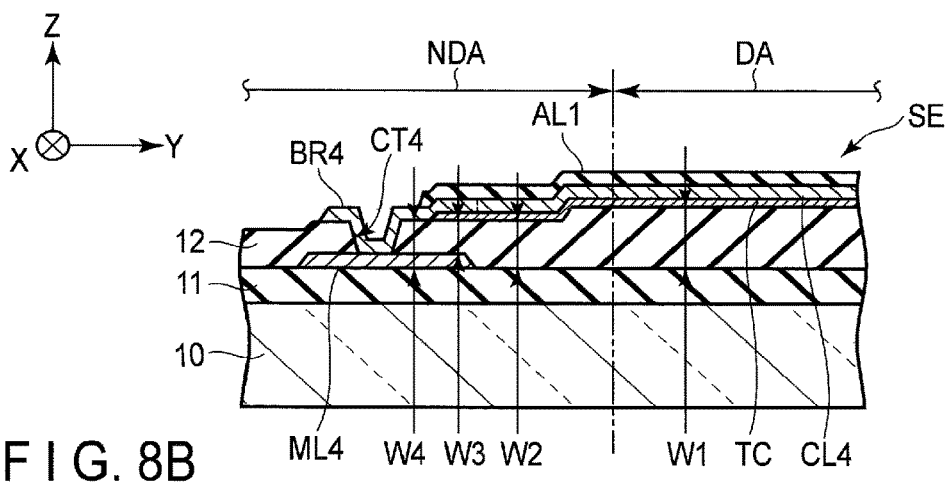
FIG. 8B is a diagram showing a modified example of the second insulating film shown in FIG. 8A.

In the modified example shown in FIG. 8B, the second thickness W2 is less than the first thickness W1 and the third thickness W3 is less than the second thickness W2. Here, the fourth thickness W4 is approximately equal to the second thickness W2. With this configuration, a step is not created in a surface opposing the first alignment film AL1 between the line CL4 and fourth end BR4 near the border therebetween.

Figure 8C:
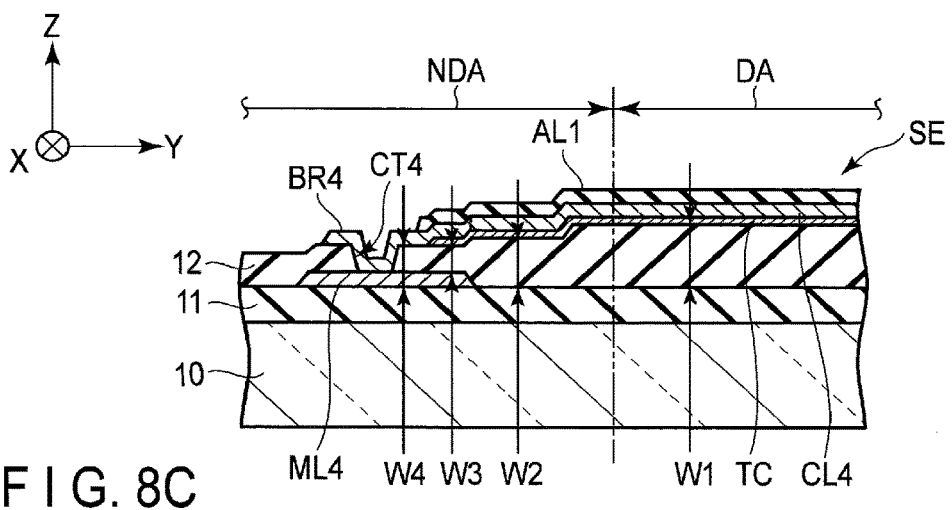
FIG. 8C is a diagram showing another modified example of the second insulating film shown in FIG. 8A.

In the modified example shown in FIG. 8C, the second thickness W2 is less than the first thickness W1 and the third thickness W3 is less than the second thickness W2. Here, the fourth thickness W4 is less than the second thickness W2. With this configuration, the surface of the fourth end BR4, which opposes the first alignment film AL1 is closer to the first insulation substrate 10 along the third direction Z near the border between the fourth end BR4 and the line CL4, as compared to the surface of the line CL4, which opposes the first alignment film AL1.

Figure 8D:
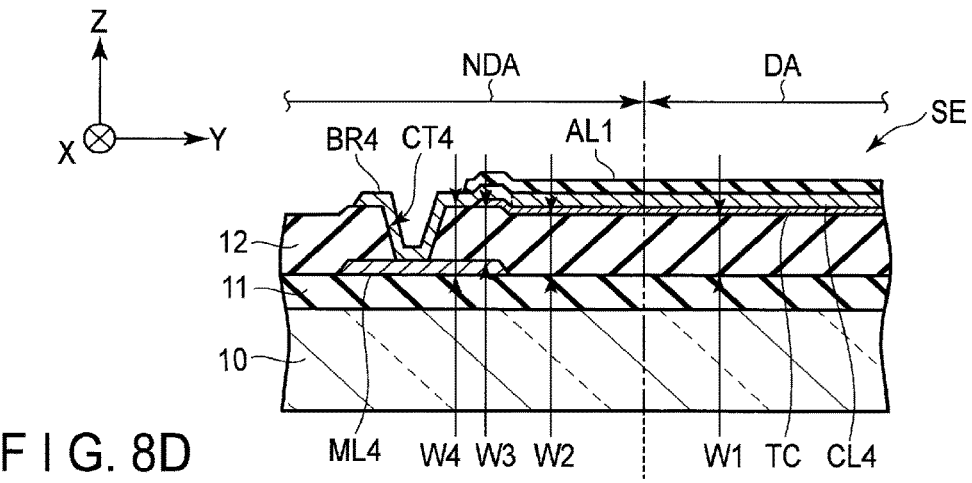
FIG. 8D is a diagram showing still another modified example of the second insulating film shown in FIG. 8A.

In the modified example shown in FIG. 8D, the second thickness W2 is equal to the first thickness W1. The third thickness W3 is less than the second thickness W2. Here, the fourth thickness W4 is greater than the second thickness W2.

Figure 8E:
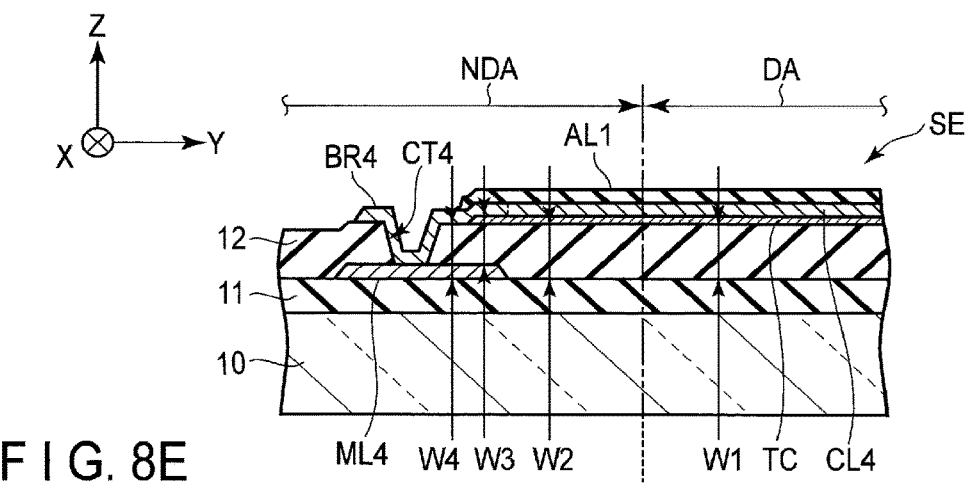
FIG. 8E is a diagram showing still another modified example of the second insulating film shown in FIG. 8A.

In the modified example shown in FIG. 8E, the second thickness W2 is equal to the first thickness W1. The third thickness W3 is less than the second thickness W2. Here, the fourth thickness W4 is approximately equal to the second thickness W2. With this configuration, a step is not created in the surface opposing the first alignment film AL1 between the line CL4 and the fourth end BR4, near the border therebetween.

Figure 8F:
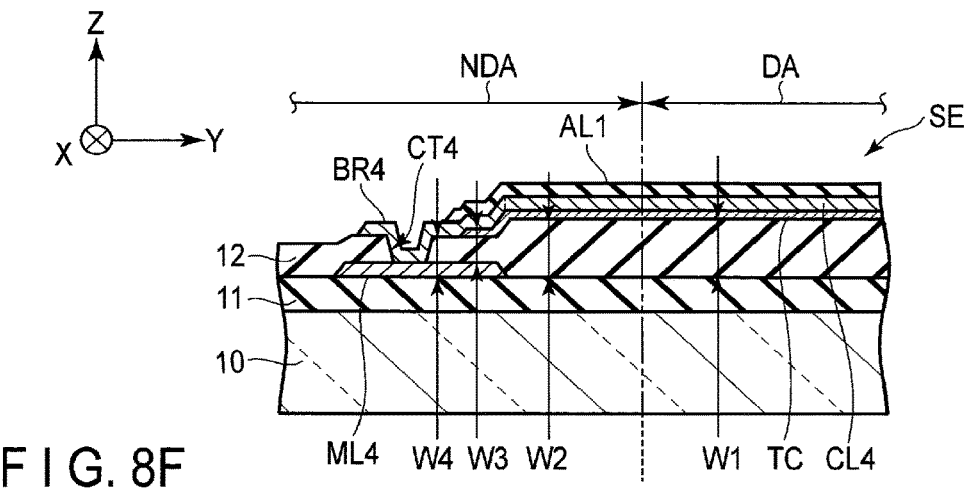
FIG. 8F is a diagram showing still another modified example of the second insulating film shown in FIG. 8A.

In the modified example illustrated to FIG. 8F, the second thickness W2 is equal to the first thickness W1. The third thickness W3 is less than the second thickness W2. Here, the fourth thickness W4 is less than the second thickness W2. With this configuration, the surface of the fourth end BR4, which opposes the first alignment film AL1 is closer to the first insulation substrate 10 along the third direction Z near the border between the fourth end BR4 and the line CL4, as compared to the surface of the line CL4, which opposes the first alignment film AL1.

As described above, according to the modified examples shown in FIGS. 8B to 8F, an effect similar to that of the third embodiment shown in FIG. 8A can be obtained.

Note that the first embodiment, the second embodiment and the third embodiment may be carried out individually or simultaneously. When carried out simultaneously, a better effect can be obtained.

The embodiments are not limited to an alignment film as long as it is formed by applying on a surface on which a sensor electrode SE is formed, followed by curing, thus making it possible to suppress the film formation error in the display area. Thus, it is possible with the embodiments to provide a display device which can suppress degradation of the display quality, which may be caused by such a film.

As described above, according to the embodiments, a display device which can suppress degradation of the image quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A display device comprising:
a mount portion disposed on one end side of a non-display area located around a display area configured to display images;
a first metal layer formed between the display area and the mount portion and extending in a first direction;
a second metal layer formed on the other end side of the non-display area and extending in the first direction;
an interlayer insulating film which covers the first and second metal layers and is thinner in the non-display area than in the display area;
a plurality of lines extending in a second direction crossing the first direction and arranged along the first direction in the display area;
a first end opposing the first metal layer via the interlayer insulating film and electrically connected to the first metal layer and the plurality of lines;

a second end opposing the second metal layer via the interlayer insulating film and electrically connected to the second metal layer and the plurality of lines;

wherein at least one of the first and second ends comprises a slit formed therein along the second direction from a display area side thereof near the display area to an opposite side of the display area side.

2. The display device of claim 1, wherein the second metal layer is disposed in a position further away from the display area than the first metal layer.

3. A display device of claim 1, wherein
the first metal layer comprises a first partial metal layer and a second partial metal layer arranged along the first direction, and
the first and second partial metal layers adjacent to each other are electrically connected to each other through a connecting portion.

4. The display device of claim 3, wherein
the first and second partial metal layers and the connection portion are formed integrally from a same conducting material.

5. The display device of claim 1, wherein
the interlayer insulating film has a first thickness in the display area and a second thickness less than the first thickness, in a region of the non-display area between the display area and the first or second metal layers.

6. The display device of claim 1, wherein
the interlayer insulating film has a first thickness in the display area and a third thickness less than the first thickness, in a region of the non-display area opposing the first or second metal layers.

7. The display device of claim 1, wherein
the interlayer insulating film has a first thickness in the display area, a second thickness less than the first thickness, in a region of the non-display area between the display area and the first or second metal layers, and a third thickness less than the second thickness, in a region opposing the first or second metal layers.

8. The display device of claim 1, wherein
the slit penetrates the first or second end in a third direction crossing the first and second directions.

9. The display device of claim 1, wherein
the slit penetrates the first or second end in the second direction.

10. The display device of claim 1, wherein
the slit is made in a position between adjacent ones of the lines.

11. The display device of claim 1, wherein
the first or second metal layer comprises a metal layer slit formed therein in a position opposing the slit.

12. The display device of claim 1, wherein
the interlayer insulating film comprises contact portions made in positions opposing the first and second metal layers and penetrating the interlayer insulating film, respectively, and
the first and second ends are electrically connected to the first and second metal layers through the contact portions, respectively.

13. The display device of claim 12, wherein
the first and second ends are formed integrally with the lines.

14. The display device of claim 12, wherein
the contact portions are formed respectively for the lines.

15. The display device of claim 12, wherein
the slit penetrates in the second direction between adjacent regions of the first or second end, which oppose the contact portions.

16. The display device given in claim 12, wherein
the first or second end comprises segments opposing the contact portions respectively and partitioned by the slit, and
the segments are non-rectangular.

17. The display device given of claim 16, wherein the segments each have a length on a side close to the display area along the first direction, which is greater than a length on a side far from the display area along the first direction.

18. The display device of claim 16, wherein the segments each have a length on a side close to the display area along the first direction, which is less than a length on a side far from the display area along the first direction.

19. The display device given in claim 12, wherein
the first or second end comprises segments opposing the contact portions respectively and formed by the slit, and
the segment are arranged in a non-linear manner.

20. The display device of claim 1, further comprising:
a transparent conductive film extending in the second direction, arranged along the first direction and directly opposing the first metal layer; and
a sensor electrode comprising the transparent conductive film, the first metal layer, the second metal layer, the lines, the first end and the second end,
wherein
to the sensor electrode, a voltage for controlling a display of an pixel is applied during a display period to display an images on the display area, and a voltage for detecting approach or contact of an object to be detected is applied during a detection period, which is at a different timing from that of the display period.

* * * * *